United States Patent
Lin et al.

(10) Patent No.: US 7,388,997 B2
(45) Date of Patent: Jun. 17, 2008

(54) ONE DIMENSIONAL FEATURE ENHANCEMENT

(75) Inventors: Chun-Huang Lin, Hsinchu (TW); Jeng-Feng Lan, Hsinchu (TW)

(73) Assignee: PixArt Imaging Inc., Hsin-Chu (TW)

( * ) Notice: Subject to any disclaimer, the term of this patent is extended or adjusted under 35 U.S.C. 154(b) by 772 days.

(21) Appl. No.: 10/832,203

(22) Filed: Apr. 26, 2004

(65) Prior Publication Data

US 2005/0141781 A1 Jun. 30, 2005

(30) Foreign Application Priority Data

Dec. 29, 2003 (TW) .............................. 92137309 A

(51) Int. Cl.
*G06K 9/38* (2006.01)
(52) U.S. Cl. ...................... 382/273; 348/373
(58) Field of Classification Search ................ 382/128, 382/167, 274, 273
See application file for complete search history.

(56) References Cited

U.S. PATENT DOCUMENTS

| 7,158,686 B2* | 1/2007 | Gindele | 382/274 |
| 2003/0219150 A1* | 11/2003 | Niles et al. | 382/128 |
| 2004/0197022 A1* | 10/2004 | Gonsalves | 382/167 |

* cited by examiner

*Primary Examiner*—Samir A. Ahmed
*Assistant Examiner*—Akililu k Woldemariam
(74) *Attorney, Agent, or Firm*—Tung & Associates

(57) ABSTRACT

A method and device of feature enhancement for digital image processing. A predefined feature in one dimension of the image is searched to obtain several peaks, and each peak is either a local maximum or local minimum. Each peak is enhanced by adding an offset to increase the local maximum or decrease the local minimum. The offset of each peak is computed by calculating the difference between each peak and the preceding peak, then multiplying by a preset ratio.

2 Claims, 2 Drawing Sheets

ONE DIMENSIONAL FEATURE ENHANCEMENT

BACKGROUND OF THE INVENTION

1. Field of the Invention

The present invention relates to image processing, and more specifically, to one-dimensional feature enhancement.

2. Description of the Related Art

A pointing device such as mouse is a standard peripheral for a computer system. A mechanical mouse typically has rollers, or wheels, that contact a rubber-surfaced steel ball at the equator thereof and convert the rotation of the ball into electrical signals. The mechanical mouse has a number of shortcomings such as deterioration or damage to the surface of the mouse ball and mouse pad, resulting form the mechanical construction and operation thereof that rely to a significant degree on a fairly delicate compromise about how mechanical forces are developed and transferred. An optical mouse utilizes optical and electronic method to compute the movement of the mouse, is a popular replacement for the mechanical mouse. Compared with the conventional mechanical mouse, an optical mouse offers better reliability and performance. Thus optical pointing devices have captured significant market share.

An optical mouse typically has a logical operation circuit and a Complementary Metal Oxide Semiconductor (CMOS) photosensing array comprising photo detectors. The CMOS photosensing array sequentially captures images of the area in which optical mouse moves and generates digital signals representing the captured image.

Images captured by the photo detectors are typically different from the real images as the captured images are distorted by both the external environment and internal signal processing and noise. The distortion of the captured image makes identifying the image in later stages of processing difficult. Therefore, appropriate actions for correcting the captured digital images are required. Examples of correction methods are image restoration, image enhancement, information extraction, link to database, and Geometric Information System (GIS). By performing correction to the captured image, the image becomes clearer and can be more easily recognized, furthermore, the similarity between the captured and real images can also be increased. Image enhancement corrects the digital image by enhancing particular features in the image. Commonly used image enhancement techniques are edge enhancement, contrast stretch, and feature extraction.

Digital images are composed of resolution cells with finite dimensions, and the edges of the image are usually blurry after the extraction process. The edge enhancement technique is an image enhancement method that clarifies the image outlines by generating spatial derivatives or digital image gradients.

The contrast stretch technique enlarges the contrast range in the image to make the image look clearer. The technique stretches each original digital value to a corresponding full range digital value according to a specific stretching ratio. A common contrast stretch technique is called linear contrast stretching, which transforms the largest recorded value to a largest allowable digital value, the smallest recorded value to a smallest allowable digital value, and transforms the remaining values according to a linear relationship. Gaussian stretching is another similar transformation technique, which assumes the distribution of the digital values is a bell shape.

Conventional image enhancement techniques correct digital images using a two-dimensional computation. However, the cost and power required for implementing two-dimensional computation in the integrated circuit are comparatively large due to the large data load and complicated computations. The present invention thus provides a simplified image enhancement method for enhancing features in digital images through one-dimensional computation.

SUMMARY OF THE INVENTION

Accordingly, the object of the present invention is to provide an image enhancement method and device thereof for correcting captured images by enhancing image features.

Another object of the present invention is to reduce the cost and power consumed by image feature enhancement in the integrated circuit.

The present invention provides a method of one-dimensional feature enhancement for a digital image comprising plurality of imaging units. Each imaging unit of the digital image has a corresponding digital value representing a specific feature of the image. The image feature can be illumination or chrominance of each pixel in the digital image. The present invention enhances the digital image by searching peak digital values in one dimension of the image, then increasing or decreasing the digital value of each peak. The peaks are areas with zero gradient, and each peak is either a local maximum or local minimum. The image sensor measures the digital value of the feature in one dimension of the image, for example, increasing or decreasing the digital value of each peak in the horizontal (X axis) dimension. The present invention determines each of the peaks as local maximum or local minimum by comparing the digital value of the peak with the digital values of the nearby pixels. The peak is a local maximum if the digital value of the peak is greater than the digital values of the nearby pixels, and vise versa. The digital value of each peak is adjusted by an offset, wherein the offset is computed by a preset ratio of the difference between the corresponding peak and a preceding peak. The digital value of a local maximum is adjusted by adding the offset to the original value, whereas the digital value of a local minimum is adjusted by subtracting the offset from the original value.

The present invention also provides a hand held device which comprises a photo capture device and a feature enhancer. The photo capture device can be a CMOS photosensing array comprising photo detectors. The photo detectors capture digital images under the pointing device and pass the images to the feature enhancer. The feature enhancer can be implemented in the logical operation circuit of the pointing device, and is used to enhance the captured images according to the one dimensional feature enhancement method of the present invention. The feature enhancer computes feature values of each pixel in one dimension of the captured image, searches peaks among the calculated feature values, and modifies the feature values of the searched for peaks to enhance the captured image.

The image feature enhancement method of the present invention can enhance either the horizontal (X) or vertical (Y) dimension of the image. If the feature enhancement is performed in one dimension, for example, the X dimension, the other dimension, for example, the Y dimension, does not require feature enhancement.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
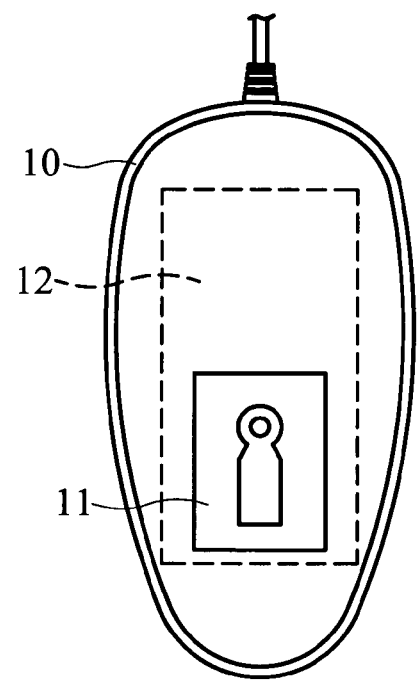
FIG. 1 is a diagram showing a typical optical mouse.
Figure 2:
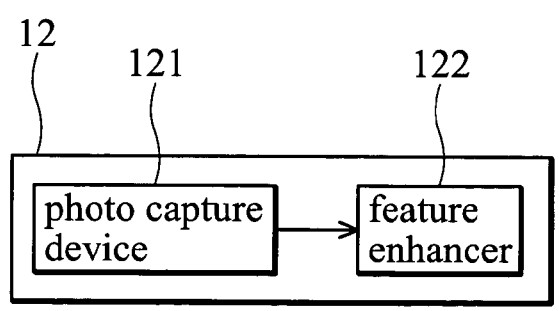
FIG. 2 is a block diagram of the integrated circuit chip shown in FIG. 1.
Figure 3:
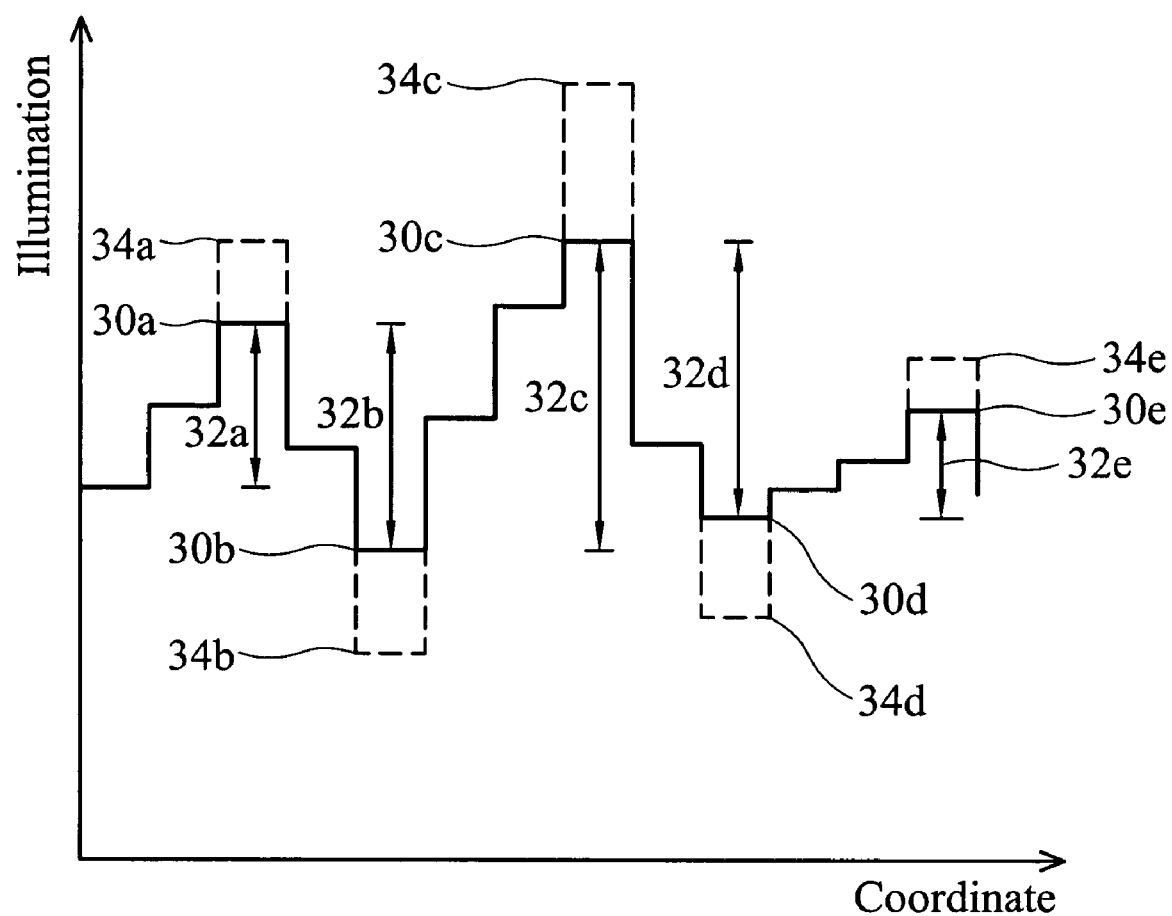
FIG. 3 is a pixel illumination distribution of a digital image for illustrating the one-dimensional feature enhancement of the present invention.

FIG. 1 is an optical mouse for implementing the one dimensional feature enhancement proposed in the present invention, and FIG. 2 is a block diagram of the integrated circuit chip 12 shown in FIG. 1. The optical mouse 10 comprises a lens 11 and an integrated circuit (IC) chip 12. As shown in FIG. 2, the integrated circuit chip 12 is generally divided into two regions. One is a photo capture device 121, for example, an array composed of Complementary Metal Oxide Semiconductor (CMOS) photo detectors. The lens 11 reflects the image under the optical mouse 10 to the photo capture device 121. The photo capture device captures and passes images to the feature enhancer 122. The feature enhancer 122 computes the feature value of each pixel in the captured image. The image feature in this example is the illumination of the pixel. The digital illumination values of both dimensions can be computed, however, the feature enhancement method of the present invention only enhances the illumination of a chosen dimension, for example, the horizontal dimension. FIG. 3 illustrates an example of the digital values corresponding to the illumination of 13 pixels in a digital image, wherein the vertical axis represents the illumination value of the pixels, and the horizontal axis represents the coordinates of the pixels. The bold line shown in FIG. 3 represents the illumination measured by the photo capture device 121 of FIG. 2. As shown in FIG. 3, the peaks of the digital values are 30a~30e. The peaks 30a~30e can be either local maximums (30a, 30c, and 30e) or local minimums (30b and 30d).

According to the present invention, the digital value of each peak is modified to enhance the feature thereof. The illumination difference 32a~32e of each peak and a preceding peak is first calculated, and multiplied by a preset ratio, then added to or subtracted from the original illumination value 30a~30e. In practice, the illumination value is a signed value, so the calculated illumination difference is also a signed value. When implementing the present invention, after multiplying the signed illumination difference with the preset ratio, it can be added to the original illumination value without determining an addition or subtraction operation. In the example shown in FIG. 3, the preset ratio is 0.5 (50%), such that the offset for each peak is the half of the illumination difference 32a~32e. As shown in the Figure, when the peak is a local maximum, half of the corresponding illumination difference is added to the original illumination value, for example, the new illumination value 34a is obtained by adding half of the illumination difference 32a to the original illumination value 30a. When the peak is a local minimum, half of the corresponding illumination difference is subtracted from the original illumination value, for example, the new illumination value 34b is obtained by subtracting half of the illumination difference 32b from the original illumination value 30b. The difference of illumination values between peaks and the remaining pixels becomes larger after adding or subtracting the illumination value of the peaks, hence enhancing the image feature.

The image feature enhancement method of the present invention only requires one-dimensional computation, which is relatively easier and faster than conventional two-dimensional computation. Furthermore, it reduces cost and power consumption, as well as reduces the size of the integrated circuit.

The embodiment of the present invention utilizes illumination as an example of the feature, whereas other image features such as chrominance are also applicable for the feature enhancement method proposed in the present invention.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of digital image processing for a digital image comprising of a plurality of imaging units, comprises the following steps:

computing feature values by measuring a predetermined feature of the imaging units in the digital image;

searching local peaks in one dimension of the feature values;

determining each peak as either a local maximum or a local minimum, wherein the peak is determined to be a local maximum if the preceding and succeeding feature values are smaller than the peak, and determined to be a local minimum if the preceding and succeeding feature values are respectively larger than the peak; and adjusting the feature value of each peak to increase the difference between the peak and at least one of its preceding and succeeding pixels by providing an offset for each peak to increase the feature value of the local maximum or decrease the feature value of the local minimum, wherein the offset for each peak is computed according to a preset ratio of a difference between the respective feature values of the corresponding peak and a preceding peak.

2. A pointing device for a computer system, comprising:

a photo capture device, capturing a digital image comprising a plurality of imaging units; and a feature enhancer, computing feature values of each imaging unit by:

measuring a predetermined feature of the imaging units in the digital image;

searching local peaks in one dimension of the feature values; determining each peak as either a local maximum or a local minimum, wherein the peak is determined to be a local maximum if the preceding and succeeding feature values are smaller than the peak, and determined to be a local minimum if the preceding and succeeding feature values are respectively larger than the peak; and adjusting the feature value of each peak to increase the difference between the peak and at least one of its preceding and succeeding pixels by generating an offset for each peak to increase the feature value of the local maximum or decrease the feature value of the local minimum, wherein the offset for each peak is computed according to a preset ratio of a difference between the respective feature values of the corresponding peak and a preceding peak.

* * * * *